United States Patent
Sone (10) Patent No.: US 11,687,296 B2
(45) Date of Patent: Jun. 27, 2023

(54) COMMUNICATION SYSTEM, NON-TRANSITORY COMPUTER-READABLE RECORDING MEDIUM STORING COMPUTER-READABLE INSTRUCTIONS FOR TERMINAL DEVICE, AND METHOD PERFORMED BY TERMINAL DEVICE

(71) Applicant: BROTHER KOGYO KABUSHIKI KAISHA, Nagoya (JP)

(72) Inventor: Tatsuhiko Sone, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/811,189

(22) Filed: Jul. 7, 2022

(65) Prior Publication Data
US 2023/0008451 A1 Jan. 12, 2023

(30) Foreign Application Priority Data
Jul. 9, 2021 (JP) .................. 2021-114350

(51) Int. Cl.
*G06F 3/12* (2006.01)
*G06K 15/00* (2006.01)
*G06Q 30/06* (2023.01)
*G06F 3/0482* (2013.01)
*G06F 3/04817* (2022.01)

(52) U.S. Cl.
CPC .......... *G06F 3/1229* (2013.01); *G06F 3/1203* (2013.01); *G06F 3/1287* (2013.01); *G06F 3/1289* (2013.01); *G06K 15/4075* (2013.01); *G06F 3/0482* (2013.01); *G06F 3/04817* (2013.01)

(58) Field of Classification Search
CPC .... G06F 3/1229; G06F 3/1203; G06F 3/1287; G06F 3/1289; G06F 3/0482; G06F 3/04817; G06K 15/4075
USPC ........................................... 358/1.15
See application file for complete search history.

(56) References Cited

U.S. PATENT DOCUMENTS

2006/0161658 A1 7/2006 Noguchi
2017/0090830 A1* 3/2017 Tomono ................ G06F 3/1219
2019/0346800 A1* 11/2019 Nogawa ................ G03G 15/556

FOREIGN PATENT DOCUMENTS

JP 2005059303 A 3/2005

* cited by examiner

*Primary Examiner* — Allen H Nguyen
(74) *Attorney, Agent, or Firm* — Scully, Scott, Murphy & Presser, PC (57) ABSTRACT

A terminal device may obtain specific information stored in a memory. The specific information may include at least one of region information indicating a region where the terminal device is used and model information of a printing device used by the terminal device. The printing device may be configured to execute printing by using a plurality of cartridges corresponding to a plurality of colors. The terminal device may determine whether a predetermined condition is satisfied or not by using the specific information, and in a case where it is determined that the condition is satisfied, send a first page request and color information to a server. The color information may indicate a selected color selected from the plurality of colors.

20 Claims, 7 Drawing Sheets

COMMUNICATION SYSTEM, NON-TRANSITORY COMPUTER-READABLE RECORDING MEDIUM STORING COMPUTER-READABLE INSTRUCTIONS FOR TERMINAL DEVICE, AND METHOD PERFORMED BY TERMINAL DEVICE

REFERENCE TO RELATED APPLICATIONS

This application claims priority to Japanese Patent Application No. 2021-114350, filed on Jul. 9, 2021, the entire contents of which are incorporated herein by reference.

BACKGROUND ART

A system comprising a terminal device, a printer, a transfer server, and a service providing apparatus is known. When a WEB support button included in a status monitor is operated, the terminal device generates a WEB support URL (Uniform Resource Locator) by combining a URL of the transfer server with various information such as ink tank remaining amount and a use language of the printer driver. The terminal device sends the WEB support URL to the transfer server. The transfer server generates a support service URL based on above various information included in the WEB support URL, and sends the support service URL to the terminal device as redirection. Due to this, the terminal device displays a support service page, by accessing the service providing apparatus, using the support service URL. The support service page is a page for purchasing ink tanks.

DESCRIPTION

Summary

The description herein realizes provision of a web page for purchasing a cartridge to a user using a scheme that is different from the conventional scheme.

A communication system disclosed herein may comprise: a terminal device; and a server. The terminal device may comprise: a memory; and a controller configured to: obtain specific information stored in the memory, wherein the specific information includes at least one of region information indicating a region where the terminal device is used and model information of a printing device used by the terminal device, and the printing device is configured to execute printing by using a plurality of cartridges corresponding to a plurality of colors; determine whether a predetermined condition is satisfied or not by using the specific information; in a case where it is determined that the condition is satisfied, send a first page request and color information to the server, the color information indicating a selected color selected from the plurality of colors; and in a case where it is determined that the condition is not satisfied, send a second page request to the server without sending the color information indicating the selected color to the server. The server may comprise a controller configured to: in a case where the color information and the first page request are received from the terminal device, send first web page data representing a first web page to the terminal device, wherein the first web page includes information for purchasing a cartridge corresponding to the selected color among the plurality of colors indicated by the color information, and does not include information for purchasing a cartridge corresponding to a color among the plurality of colors which is different from the selected color; and in a case where the second page request is received from the terminal device without the color information being received from the terminal device, send second web page data representing a second web page to the terminal device, wherein the second web page includes, for each of the plurality of colors, information for purchasing a cartridge corresponding to the color.

According to the above configuration, the terminal device determines whether or not the predetermined condition is satisfied by using the specific information stored in the memory. In the case of determining that the condition is satisfied, the terminal device sends the color information indicating the selected color and the first page request to the server and displays the first web page including the information for purchasing the cartridge corresponding to the selected color and not including the information for purchasing a cartridge corresponding to a color different from the selected color. Since the color of the cartridge is already narrowed down in the first web page, the user can easily purchase the cartridge.

A non-transitory computer-readable recording medium storing computer-readable instructions for a terminal device is disclosed. The computer-readable instructions, when executed by a processor of the terminal device, may cause the terminal device to: obtain specific information stored in a memory, wherein the specific information includes at least one of region information indicating a region where the terminal device is used and model information of a printing device used by the terminal device, the printing device being configured to execute printing by using a plurality of cartridges corresponding to a plurality of colors; determine whether a predetermined condition is satisfied or not by using the specific information; in a case where it is determined that the condition is satisfied, send a first page request and color information to a server, the color information indicating a selected color selected from the plurality of colors.

A computer program for realizing the aforementioned terminal device is also novel and useful. Further, the terminal device itself and a method executed by the terminal device are also novel and useful.

Figure 1:
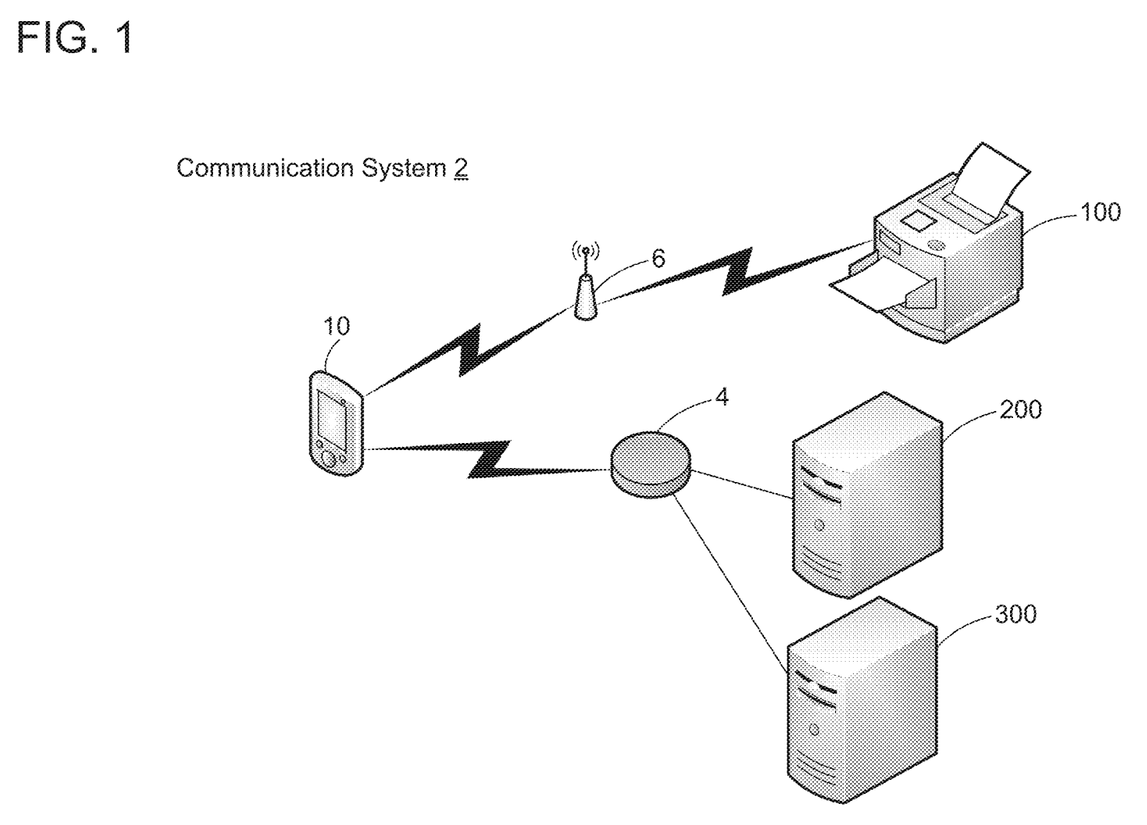
FIG. 1 schematically shows a configuration of a communication system.

EMBODIMENT (Configuration of Communication System 2: FIG. 1)

As shown in FIG. 1, a communication system 2 comprises a terminal 10, a printer 100, and a plurality of servers 200, 300. In the present embodiment, it is realized that a user uses the terminal 10 to access one of the servers 200, 300, and purchases an ink cartridge to be mounted in the printer 100. Hereinbelow, a cartridge is termed "CTG".

The terminal 10 and the printer 100 are connected to an access point (hereinbelow termed "AP") 6. Thus, the terminal 10 and the printer 100 are configured capable of communicating with each other via the AP 6. Further, the terminal 10 is capable of connecting to Internet 4. The terminal 10 may connect to the Internet 4 via the AP 6 or via a base station for realizing 4G or 5G mobile communication.

Each of the servers 200, 300 is connected to the Internet 4. Thus, the terminal 10 is capable of communicating with each of the servers 200, 300 via the Internet 4.

Figure 2:
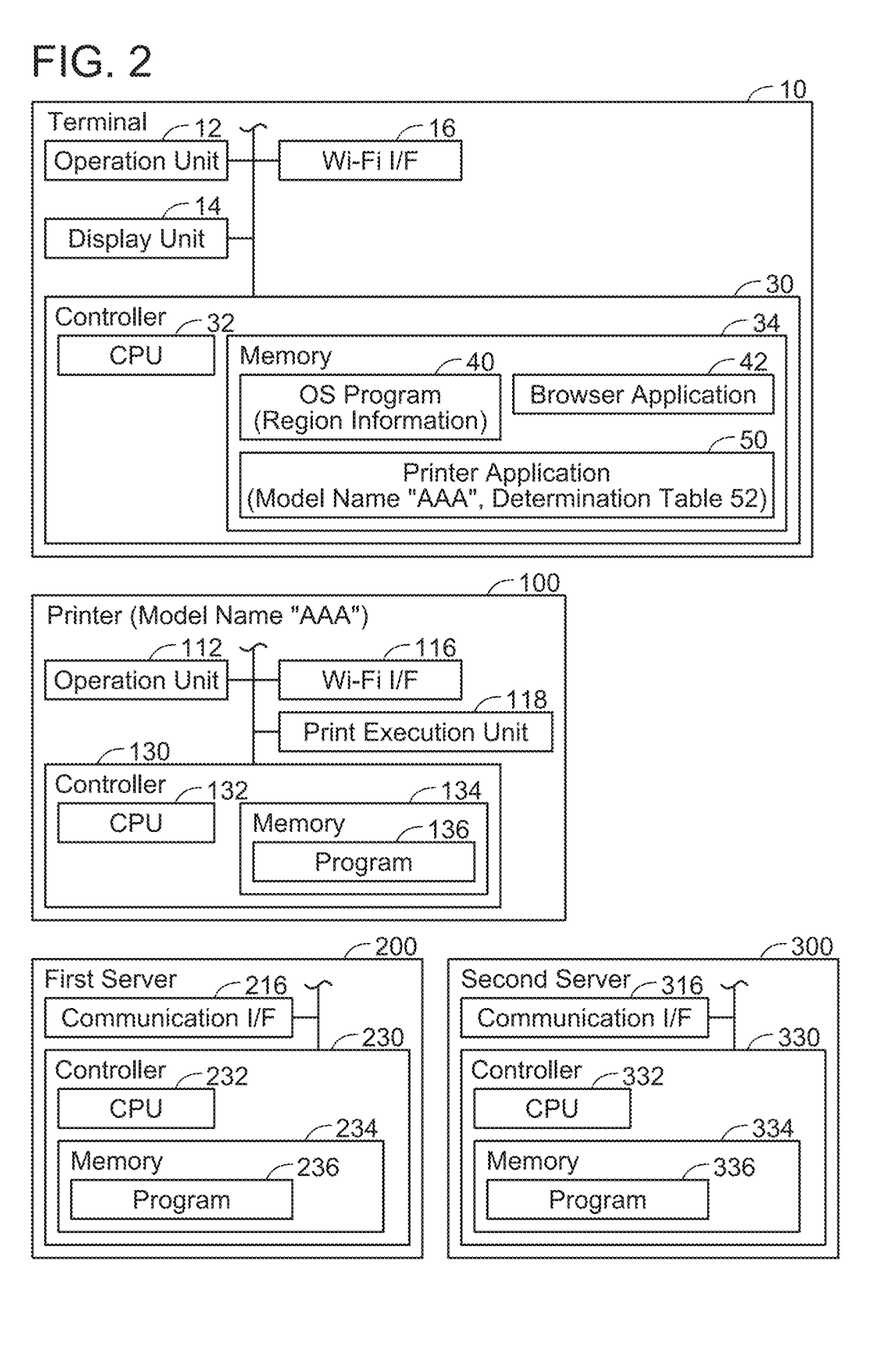
FIG. 2 shows a hardware configuration of each device.

(Configuration of Terminal 10: FIG. 2)

Next, hardware configurations of the respective devices 10, 100, 200, 300 will be described with reference to FIG. 2. The terminal 10 is a portable terminal such as a mobile phone (e.g., a smartphone), a PDA, a tablet PC, or the like. In a modification, the terminal 10 may be a stationary terminal. The terminal 10 comprises an operation unit 12, a display unit 14, a Wi-Fi interface 16, and a controller 30. Although not shown, the terminal 10 may further comprise an interface for executing 4G or 5G mobile communication. The respective units 10 to 30 are connected to a bus line (reference sign omitted).

The operation unit 12 includes a plurality of buttons. The user can input various instructions to the terminal 10 by operating the operation unit 12. The display unit 14 is a display for displaying various types of information. The display unit 14 further functions as a so-called touch panel (i.e., operation unit). The Wi-Fi interface 16 is an interface for establishing a wireless connection with the AP 6.

The controller 30 comprises a CPU 32 and a memory 34. The CPU 32 is configured to execute various processes in accordance with programs 40, 42, 50 stored in the memory 34. The memory 34 is composed of a volatile memory, a non-volatile memory, etc. The memory 34 stores the OS program 40, the browser application 42, and the printer application 50. Hereinbelow, an application may be termed "app".

The OS program 40 is a program for executing basic processes of the terminal device 10, and may for example be iOS (registered trademark) or Android (registered trademark). The OS program 40 is already stored in the terminal 10 at the time of shipping of the terminal 10. When initial setting of the terminal 10 is to be performed, the user selects a region where the terminal 10 is to be used (e.g., Japan, United States, or Europe). Region information indicating the region designated by the user is stored in a storage area within the memory 34 assigned to the OS program 40.

The browser app 42 is a program for accessing a web server on the Internet (e.g., the servers 200, 300) and browsing web pages. The browser app 42 is stored in advance in the terminal 10 at the time of shipping of the terminal 10. The browser app 42 is a general purpose web browser application such as Internet Explorer (registered trademark) and Microsoft Edge (registered trademark), and is generally provided by a software vendor different from a vendor of the printer 100. The printer app 50 is provided by the vendor of the printer 100. Not being limited to using the aforementioned general purpose web browser application, the printer app 50 may have a function to display web pages as WebView. In this case, this WebView function is included in the printer app 50 and is provided by the vendor of the printer 100.

The printer app 50 is a program for causing the printer 100 to execute printing. The printer app 50 is a program provided by the vendor of the printer 100, and is installed in the terminal 10 after shipping of the terminal 10. Although details will be given later, the user can select a target printer to be controlled by the printer app 50 (which is the printer 100 in the present embodiment). In this case, a storage area within the memory 34 assigned to the printer app 50 stores information such as a model name "AAA" of the printer 100 selected by the user, and a status of the printer 100. A determination table 52 is further stored in this storage area when the printer app 50 is installed in the terminal 10. The determination table 52 is a table for determining which one of the servers 200, 300 should be accessed to purchase an ink CTG using the terminal 10.

(Configuration of Printer 100)

The printer 100 is a peripheral device (e.g., a peripheral device of the terminal device 10) configured to execute a print function. The printer 100 needs to comprise at least the print function, and may be a multifunction peripheral further having a scan function and a facsimile function. The printer 100 has the model name "AAA". The printer 100 comprises an operation unit 112, a Wi-Fi interface 116, a print execution unit 118, and a controller 130. The respective units 112 to 130 are connected to a bus line (reference sign omitted).

The operation unit 112 includes a plurality of buttons. The user can input various instructions to the printer 100 by operating the operation unit 112. The Wi-Fi interface 116 is an interface for establishing a wireless connection with the AP 6. In the present embodiment, the print execution unit 118 comprises an inkjet printing mechanism. The print execution unit 118 is configured to detachably receive ink CTGs respectively containing ink in four colors of CMYK. The print execution unit 118 is configured to execute color printing using the ink in the four CMYK colors. In a modification, the print execution unit 118 may comprise a print mechanism in another scheme such as an electrophotographic scheme and a thermosensitive scheme.

The controller 130 comprises a CPU 132 and a memory 134. The CPU 132 is configured to execute various processes in accordance with a program 136 stored in the memory 134. The memory 134 is composed of a volatile memory, a non-volatile memory, etc.

(Configuration of Servers 200, 300)

Each of the servers 200, 300 is a so-called web server, and may for example be established on the Internet 4 by the vendor of the printer 100 or by a business entity different from the vendor of the printer 100. Each of the servers 200, 300 is configured to provide a web page for purchasing an ink CTG to be mounted in the printer 100.

The first server 200 comprises a communication interface 216 and a controller 230. The respective units 216 and 230 are connected to a bus line (reference sign omitted). The communication interface 216 is connected to the Internet 4. The controller 230 comprises a CPU 232 and a memory 234. The CPU 232 is configured to execute various processes in accordance with a program 236 stored in the memory 234. The memory 234 is composed of a volatile memory, a non-volatile memory, etc.

The second server 300 comprises a communication interface 316 and a controller 330. The respective units 316 and 330 are connected to a bus line (reference sign omitted). The communication interface 316 is connected to the Internet 4. The controller 330 comprises a CPU 332 and a memory 334. The CPU 332 is configured to execute various processes in accordance with a program 336 stored in the memory 334. The memory 334 is composed of a volatile memory, a non-volatile memory, etc.

The first server 200 is configured to allow accesses from a region indicated by region information "XXX" (e.g., Europe) (i.e., configured to sell ink CTGs to habitants of this region) but does not allow accesses from other regions (e.g., Japan and United States). The second server 300 is configured to allow accesses from a region indicated by region information "YYY" or "ZZZ" (e.g., Japan or United States) but does not allow accesses from other regions (e.g., Europe). Further, the first server 200 can sell ink CTGs for printers having the model name "AAA" (e.g., printer 100) but cannot sell ink CTGs for printers having a model name "BBB". The second server 300 can sell both the ink CTGs for printers having the model name "AAA" and the ink CTGs for printers having the model name "BBB".

As above, in the first and second servers 200, 300, the regions that can access them are limited, and further, models of the printers are limited. If the user wishes to purchase an ink CTG using the printer app 50 of the terminal 10, the user must access one of the servers 200 and 300. Due to this, in the present embodiment, the printer app 50 is configured to access the suitable one of the servers 200 and 300 in accordance with the region information stored in the terminal 10 and the model name of the printer 100 controlled by the printer app 50. Thus, the user can suitably purchase the ink CTG.

Further, although details will be given later, the first server 200 is configured capable of providing a refined web page listing only ink CTG(s) in a color that was selected by the user in advance among various ink CTGs which the first server 200 is capable of selling. On the other hand, the second server 300 is not capable of providing a refined web page listing only the ink CTG(s) in the color that was selected by the user in advance. Due to this, the printer app 50 asks the user to perform color selection prior to accessing the first server 200 when it is to access the first server 200 in accordance with the region information and the model name. Further, the printer app 50 does not ask the user to perform the color selection prior to accessing the second server 300 when it is to access the second server 300 in accordance with the region information and the model name. As above, the printer app 50 can execute a suitable process in accordance with which one of the first server 200 and the second server 300 should be accessed.

Figure 3:
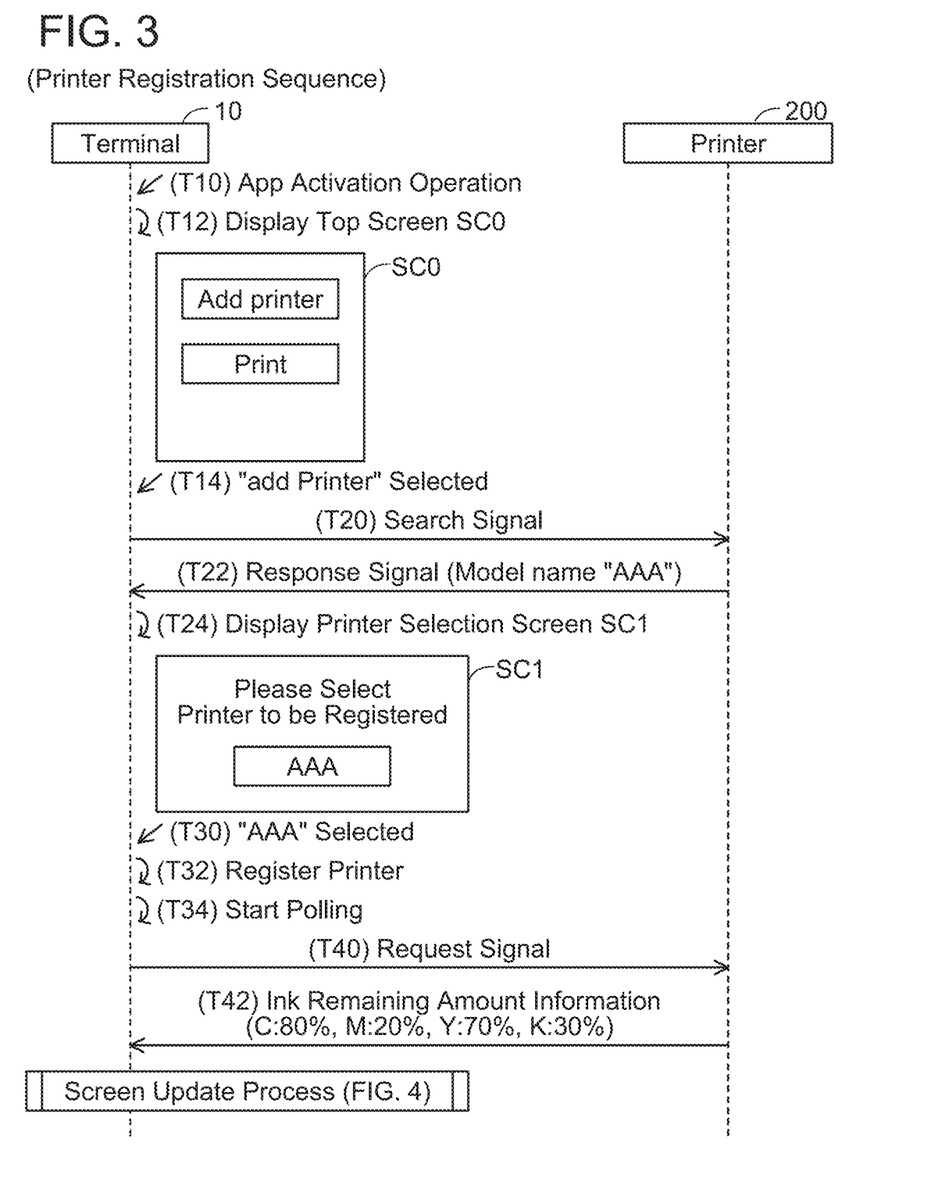
FIG. 3 shows a sequence diagram of a process to register information related to a printer in a terminal.

(Printer Registration Sequence: FIG. 3)

Next, a process for registering information related to the printer 100 in the terminal 10 will be described with reference to FIG. 3. For facilitating understanding in the description for FIG. 3, operations executed by the CPUs (e.g., CPU 32) of the respective devices will be described with the respective devices (e.g., terminal 10) as a subject of action rather than the CPUs as the subject of action. This applies similarly to the descriptions related to FIGS. 6 and 7 to be given later.

In T10, the terminal 10 accepts an operation to activate the printer app 50 from the user. Due to this, the terminal 10 activates the printer app 50 and executes processes of T12 to T42 as below in accordance with the printer app 50.

In T12, the terminal 10 causes the display unit 14 to display a top screen SC0. The top screen SC0 includes an "Add Printer" icon which is a trigger for initiating the registration process. This icon is displayed when there is no information related to printers registered in the terminal 10. The top screen SC0 further includes a "Print" icon for causing a registered printer to execute printing.

When the terminal 10 accepts the user's operation selecting the "Add Printer" icon in T14, it broadcasts a search signal to the AP 6 (see the drawing) in T20. The search signal is a signal for searching printers connected to the AP 6, and in the present case, it is received by the printer 100. Then, in T22, the terminal 10 receives a response signal including the model name "AAA" of the printer 100 from the printer 100 via the AP 6. In this case, in T24, the terminal 10 causes the display unit 14 to display a printer selection screen SC1 including the model name "AAA" in the response signal.

In T30, the terminal 10 accepts the user's operation selecting the model name "AAA" included in the printer selection screen SC1. In this case, in T32, the terminal 10 registers the information related to the printer 100 in the storage area for the printer app 50 assigned within the memory 34. This information includes not only the model name "AAA" of the printer 100, but also information such as print conditions which are available in the printer 100 (e.g., paper size, number of colors) and an IP address of the printer 100, for example.

Then, in T34, the terminal 10 starts polling. This polling is a process for periodically obtaining remaining amount information indicating remaining amounts of ink in ink CTGs of the respective colors mounted in the printer 100. Specifically, the terminal 10 sends a request signal to the printer 100 in T40 and receives the ink remaining amount information from the printer 100 in T42. The terminal 10 causes the memory 34 to store the latest ink remaining amount information received from the printer 100.

By executing the foregoing processes, the terminal 10 can register the information related to the printer 100 in the memory 34. In this case, when the user's operation selecting the "Print" icon included in the top screen SC0 is accepted, the terminal 10 can send print data to the printer 100 and cause the printer 100 to execute printing of an image represented by this print data.

Further, the terminal 10 executes a screen update process (see FIG. 4) in response to completion of the registration of the information related to the printer 100. This process is a process for updating displayed contents of the top screen SC0.

Figure 4:
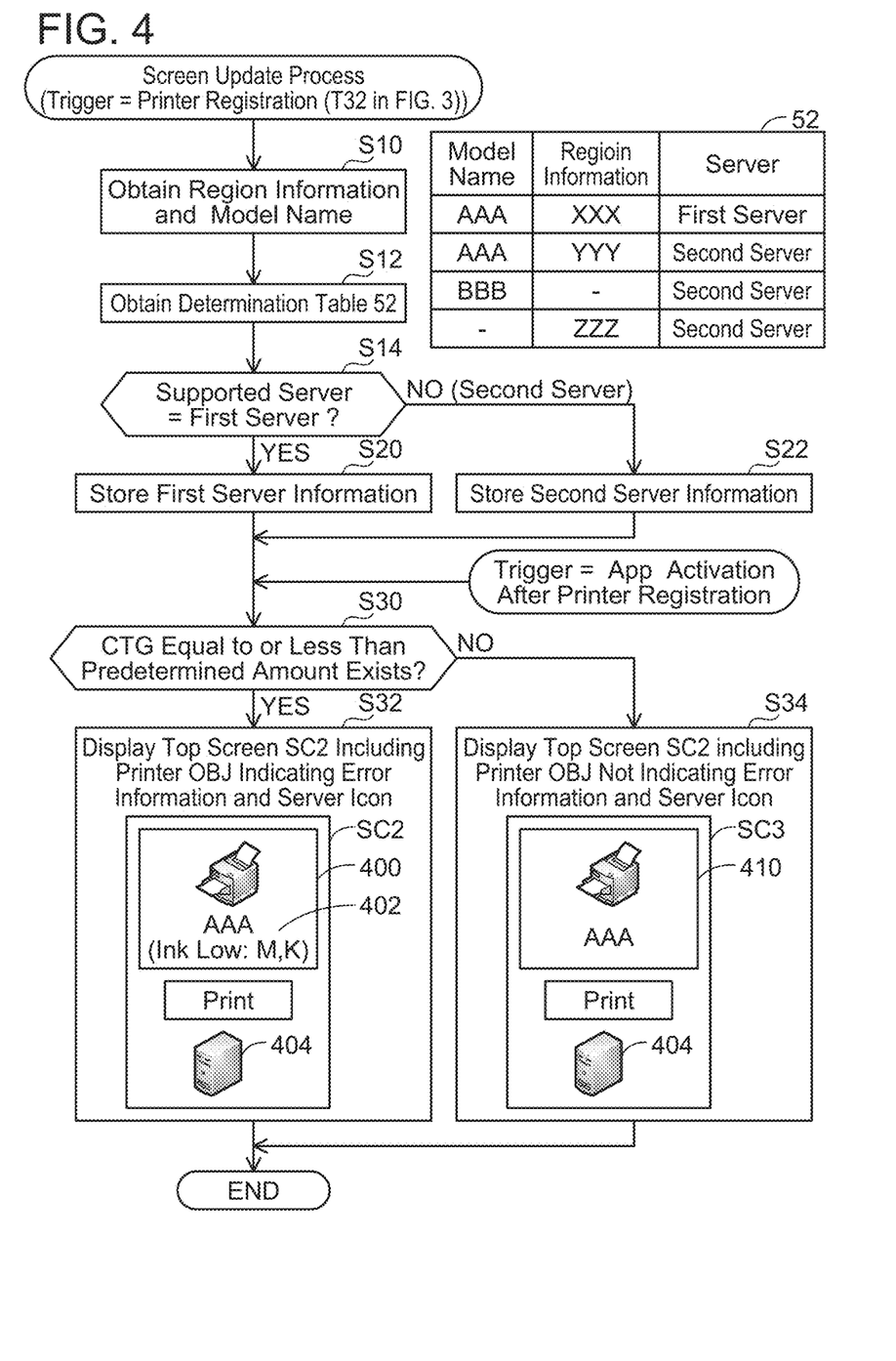
FIG. 4 shows a flowchart of a screen update process.

(Screen Update Process: FIG. 4)

Next, the screen update process (see the last step in FIG. 3) which the CPU 32 of the terminal 10 executes in accordance with the printer app 50 will be described with reference to FIG. 4. The following description will be given with the printer app 50 as the subject of action rather than the CPU 32 as the subject of action. This applies similarly to FIG. 5 to be described later.

In S10, the printer app 50 obtains the region information from the storage area for the OS program 40 assigned within the memory 34. In S10, the printer app 50 further obtains the model name "AAA" (see T32 of FIG. 3) from the storage area for the printer app 50 assigned within the memory 34.

In S12, the printer app 50 obtains the determination table 52 from the storage area for the printer app 50 assigned within the memory 34. In a modification, the printer app 50 may obtain the determination table 52 from an external server instead of obtaining the determination table 52 from the memory 34. The determination table 52 is a table in which a model name, region information, and server information are associated with each other. As aforementioned, accessible regions are limited in the first and second servers 200, 300, and further the printer models are also limited. The server information included in the determination table 52 indicates which one of the first server 200 and the second server 300 is the server that should be accessed in accordance with the model name and the region information (hereinbelow may be termed "supported server"). For example, the supported server corresponding to the model name "AAA" and the region information "XXX" is the first server 200, and the supported server corresponding to the model name "AAA" and the region information "YYY" is the second server 300. Further, for example, the supported server corresponding to the model name "BBB" is the second server 300 regardless of the region information, and the supported server corresponding to the region information "ZZZ" is the second server 300 regardless of the model name.

In S14, the printer app 50 determines which one of the first server 200 and the second server 300 is the supported server by using the region information and the model name obtained in S10 and the determination table 52 obtained in S12. In a case of determining that the supported server is the first server 200 (YES to S14), the printer app 50 causes the memory 34 to store first server information in S20. Here, the printer app 50 causes the first server information to be stored in a predetermined storage area different from that for the determination table 52. In a case of determining that the supported server is the second server 300 (NO to S14), the printer app 50 causes the memory 34 to store second server information in S22. Here, the printer app 50 causes the second server information to be stored in the predetermined storage area as aforementioned.

Then, in S30, the printer app 50 obtains the latest ink remaining amount information from the memory 34, and uses this ink remaining amount information to determine whether there is an ink CTG that is equal to or less than a predetermined remaining amount among four ink CTGs mounted in the printer 100. The predetermined remaining amount in the present embodiment is 30%, however, in a modification, it may be a value different from 30% (e.g., 20%, 40%). In a case of determining that there is an ink CTG that is equal to or less than the predetermined remaining amount (YES to S30), the printer app 50 proceeds to S32, and in a case of determining that there is no ink CTG that is equal to or less than the predetermined remaining amount (NO to S30), the printer app 50 proceeds to S34.

In S32, the printer app 50 causes the display unit 14 to display a top screen SC2 including a printer object 400 indicating error information 402 and a server icon 404. The error information 402 indicates that there is an ink CTG that is equal to or less than the predetermined remaining amount. In the example of FIG. 4, the ink CTGs of M and K are indicated as respectively being equal to or less than the predetermined remaining amount. Since the error information 402 is displayed, the user can acknowledge that there are ink CTGs that are equal to or less than the predetermined remaining amount and that the ink CTGs should be purchased by accessing the servers 200, 300. The printer object 400 further includes the model name "AAA" of the printer 100. The server icon 404 is an icon for accessing one of the servers 200, 300. When S32 is completed, the process of FIG. 4 ends.

In S34, the printer app 50 causes the display unit 14 to display the top screen SC2 including a printer object 410 not indicating the error information 402 and the server icon 404. When S34 is completed, the process of FIG. 4 ends.

When the printer app 50 is activated after the information related to the printer 100 has been registered, the top screen SC0 in T12 of FIG. 3 is not displayed. Instead, the processes of S30 to S34 of FIG. 4 are executed, and the top screen SC2 or the top screen SC3 is displayed. Further, a region from which both the first server 200 and the second server 300 cannot be accessed may exist. In the determination table 52, "N/A (i.e., not applicable)" is stored as server information corresponding to region information indicating such a region. In a case where "N/A (i.e., not applicable)" is specified as the server information corresponding to the obtained region information in the determination of S14 using the determination table 52, the printer app 50 does not execute S20 and S22, and further does not cause the server icon 404 to be displayed in S32 or S34.

Figure 5:
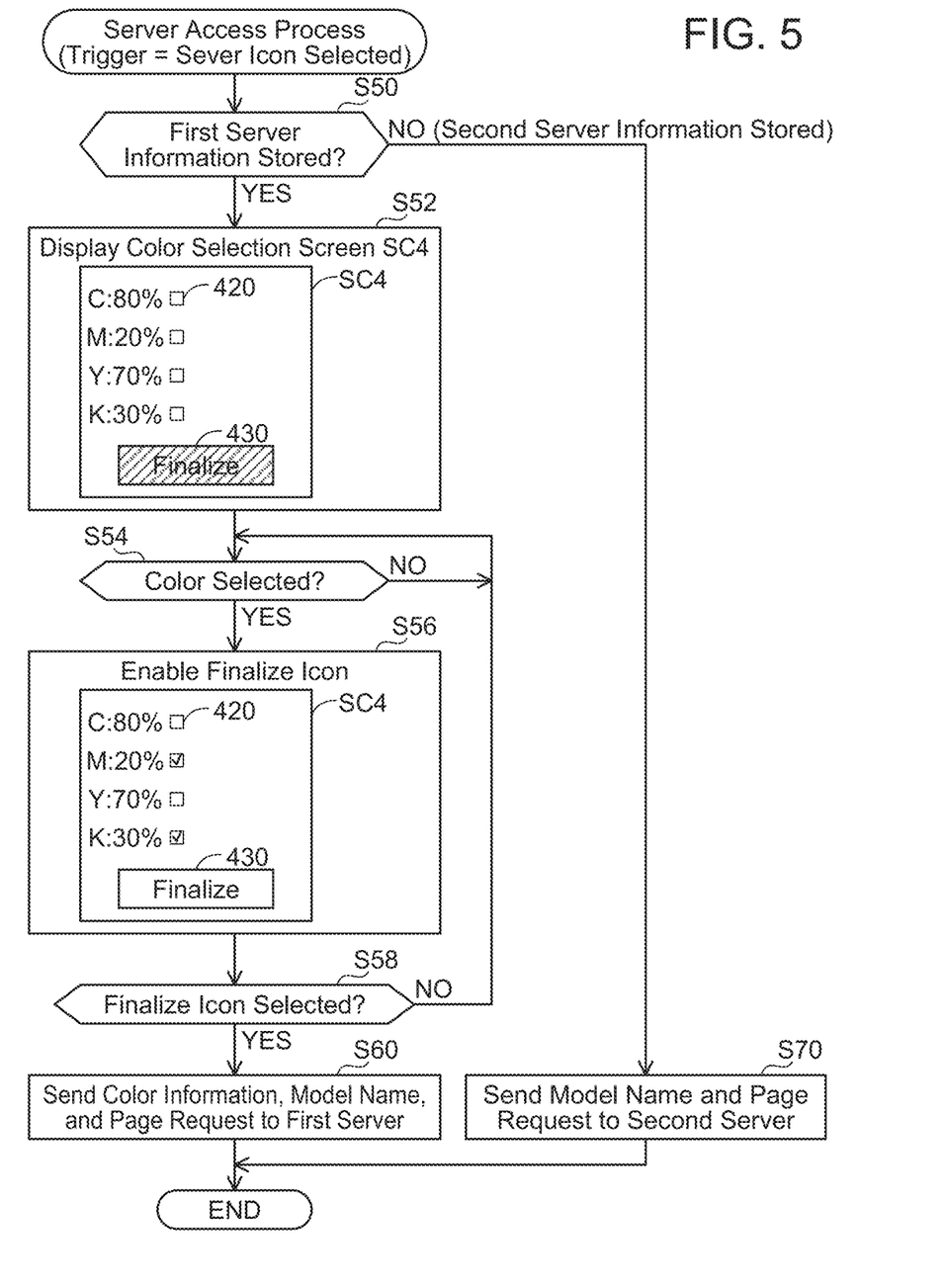
FIG. 5 shows a flowchart of a server access process.

(Server Access Process: FIG. 5)

Next, a server access process which the CPU 32 of the terminal 10 executes in accordance with the printer app 50 will be described with reference to FIG. 5. This process is executed with the selection of the server icon 404 by the user in the top screen SC2 or the top screen SC3 (see S32 and S34 of FIG. 3) as a trigger.

When the printer app 50 accepts the user's operation selecting the server icon 404, it determines in S50 whether the first server information is stored in the memory 34 (see S20 of FIG. 3) or the second server information is stored in the memory 34 (see S22). Specifically, the printer app 50 determines that the first server information is stored (YES to S50) in a case where the first server information is stored in the predetermined storage area different from that for the determination table 52, and proceeds to S52. Further, the printer app 50 determines that the second server information is stored (NO to S50) in a case where the second server information is stored in the predetermined storage area, and proceeds to S70.

In S52, the printer app 50 causes the display unit 14 to display a color selection screen SC4. The color selection screen SC4 is a screen for selecting one or more colors from among the four CMYK colors, and includes four checkboxes 420 corresponding to the four CMYK colors. The user can select the color(s) of the purchase-target ink CTG(s) by selecting the checkbox(es). Further, the color selection screen SC4 includes the latest ink remaining amount information stored in the memory 34. As such, the user can easily acknowledge the color(s) of which ink remaining amount is low, thus can suitably select the color(s) of the purchase-target ink CTG(s).

The color selection screen SC4 includes a "Finalize" icon 430 for finalizing (confirming) the selection of the one or more colors. When no colors are selected, that is, in a state where the color selection screen SC4 is just displayed in S52, the "Finalize" icon 430 is displayed in a so-called gray-out style. That is, the "Finalize" icon 430 is displayed in a style incapable of accepting the user's selection.

In S54, the printer app 50 monitors acceptance of the user's selection of one or more colors. In a case of accepting the selection of one or more colors (YES to S54), the printer app 50 enables the "Finalize" icon 430 in S56. That is, the printer app 50 cancels the gray-out of the "Finalize" icon 430. That is, the "Finalize" icon 430 is now displayed in a style capable of accepting the user's selection. As above, since the color selection screen SC4 includes the "Finalize" icon 430, the user can easily understand that ink CTG(s) can be purchased by selecting the "Finalize" icon 430 after having selected one or more colors.

Then, in S58, the printer app 50 monitors acceptance of the user's selection of the "Finalize" icon 430. In a case of accepting the selection of the "Finalize" icon 430 (YES to S58), the printer app 50 proceeds to S60.

In a case where the selection of one or more of the colors is cancelled or another color is further selected without the "Finalize" icon 430 being selected, the printer app 50 determines NO to S58 and returns to S54. Here, the printer app 50 determines NO to S54 in a case where the selection of all of the colors is cancelled (e.g., case where the selection of M and K displayed in S56 is cancelled), and waits until another color selection is accepted. In a case where the color selection is partially cancelled (e.g., case where only the selection of K between M and K displayed in S56 is cancelled), the printer app 50 determines YES to S54 and displays this latest selection result (e.g., state in which M is selected) in S56. In a case where the color selection is partially changed (e.g., case where only the selection of K between M and K displayed in S56 is cancelled and Y is newly selected), the printer app 50 determines YES to S54 and displays this latest selection result (e.g., state in which M and Y are selected) in S56. In a case where the color selection is entirely changed (e.g., case where the selection of both M and K displayed in S56 is cancelled and Y is newly selected), the printer app 50 determines YES to S54 and displays this latest selection result (e.g., state in which Y is selected) in S56.

In S60, the printer app 50 sends color information indicating the one or more colors selected in the color selection screen SC4, the model name "AAA" of the printer 100, and a page request to the first server 200. Although details will be given later, when the page request is sent to the first server 200, product purchase page data is received from the first server 200, and a product purchase page represented by this data is displayed on the display unit 14. When S60 is completed, the process of FIG. 5 ends.

In S70, the printer app 50 sends the model name "AAA" of the printer 100 and the page request to the second server 300. The color information is not sent to the second server 300. Although details will be given later, when the page request is sent to the second server 300, product selection page data is received from the second server 300, and a product selection page represented by this data is displayed on the display unit 14. When S70 is completed, the process of FIG. 5 ends.

Figure 6:
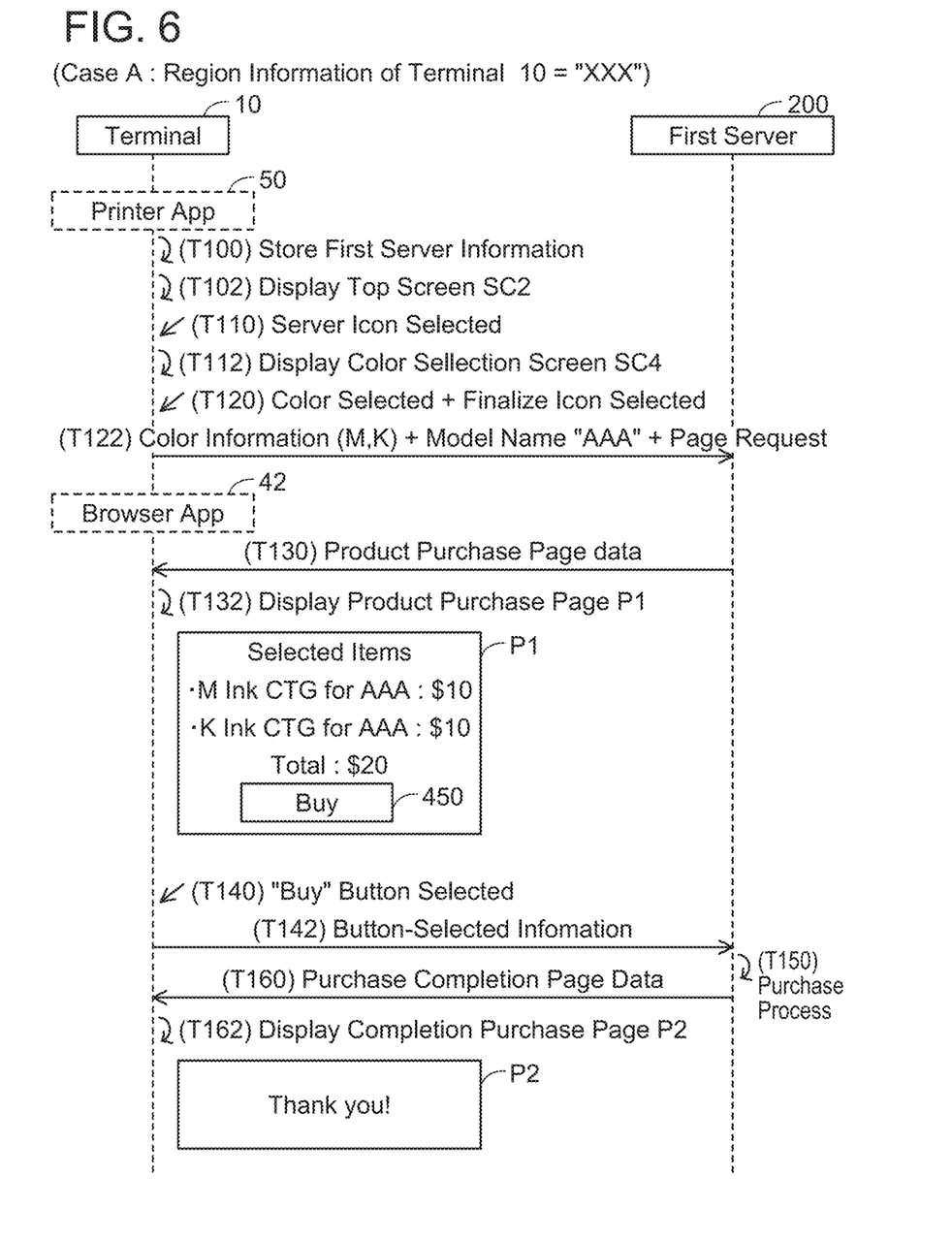
FIG. 6 shows a sequence diagram of Case A.
Figure 7:
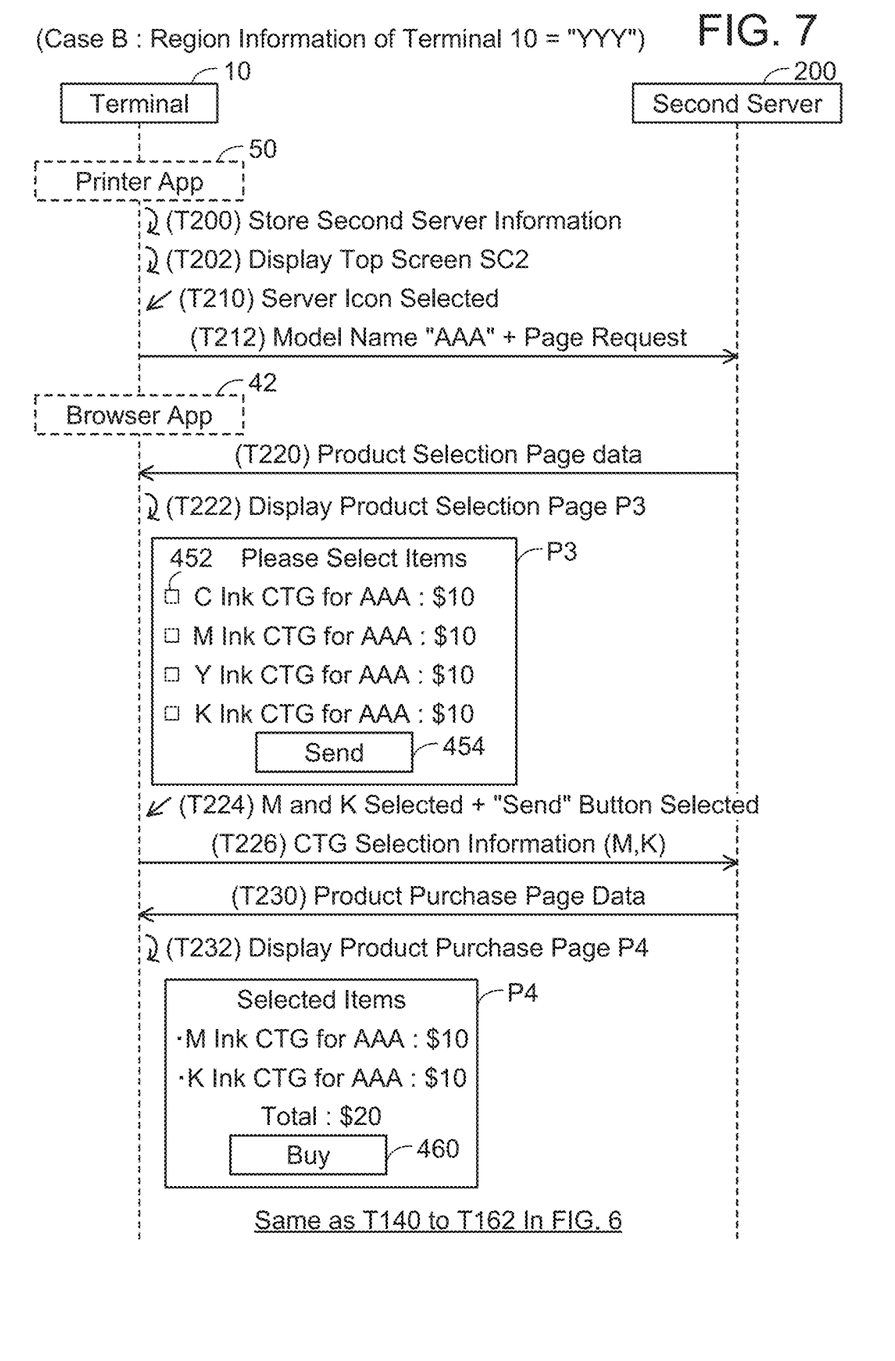
FIG. 7 shows a sequence diagram of Case B.

(Specific Cases: FIGS. 6 and 7)

Next, specific cases realized by the respective processes of FIGS. 4 and 5 will be described. Case A of FIG. 6 is a case in which the first server information is stored in the memory 34. Case B of FIG. 7 is a case in which the second server information is stored in the memory 34. Here, Case A is on the premise that the user of the terminal 10 has already registered information for purchasing ink CTGs through the first server 200 (e.g., account information, address information, credit card information) in the first server 200. Further, Case B is on the premise that the user of the terminal 10 has already registered information for purchasing ink CTGs through the second server 300 in the second server 300.

(Case A: FIG. 6)

The terminal 10 executes processes of T100 to T122 in accordance with the printer app 50. In Case A, the terminal 10 stores the model name "AAA" and the region information "XXX". The model name "AAA" and the region information "XXX" are stored in the memory 34 in the predetermined storage area different from that for the determination table 52. The terminal 10 determines based on the determination table 52 that the supported server corresponding to the model name "AAA" and the region information "XXX" is the first server 200 (YES to S14 of FIG. 4), and stores the first server information in T100 (S20).

In T102, the terminal 10 displays the top screen SC2 (YES to S30, S32), and in T110, it accepts the selection of the server icon 404 (trigger for the process of FIG. 5). In this case, in T112, the terminal 10 displays the color selection screen SC4 (YES to S50, S52). As above, since the color selection screen SC4 is displayed instead of the top screen SC2 in response to the selection of the server icon 404, the user can more easily understand the procedure of the operation for purchasing ink CTGs as compared to a configuration accepting the color selection in the top screen SC2. Then, in T120, the terminal 10 accepts the selection of M and K with the low remaining amounts (S52, YES to S54, S56), and accepts the selection of the "Finalize" icon 430 (YES to S58). In this case, in T122, the terminal 10 sends the color information indicating M and K, the model name "AAA", and the page request to the first server 200 (S60).

When the page request and other information as above are received from the terminal 10 in T122, the first server 200 specifies a plurality of ink CTGs that can be mounted on the printer 100 having the model name "AAA" from among the ink CTGs which the first server 200 is capable of selling, and further specifies two ink CTGs corresponding to M and K indicated by the color information from among the plurality of ink CTGs. Then, the first server 200 generates a product purchase page including information indicating the specified two ink CTGs but not including information indicating other ink CTGs. Then, in T130, the first server 200 sends the product purchase page data representing this page to the terminal 10.

Processes from T132 are executed by the browser app 42 instead of the printer app 50 of the terminal 10. When the product purchase page data is received from the first server 200 in T130, the terminal 10 causes the display unit 14 to display a product purchase page P1 represented by this data in T132. The product purchase page P1 has the two ink CTGs of M and K for the printer 100 having the model name "AAA" already selected. The product purchase page P1 further includes a "Buy" button 450 for completing purchase of the selected two ink CTGs. That is, in the product purchase page P1, two ink CTGs are in a so-called cart. Thus, the user can purchase the two ink CTGs by simply selecting the "Buy" button 450 (i.e., in a one-click operation).

When the terminal 10 accepts the user's selection of the "Buy" button 450 in the product purchase page P1 in T140, it sends button-selected information indicating that the "Buy" button 450 has been selected to the first server 200 in T142.

When the button-selected information is received from the terminal 10 in T142, the first server 200 executes a purchase process in T150. The purchase process includes a process for shipping the two ink CTGs selected in the product purchase page P1 to the user and a process of charging the price using the user's credit card information. Then, in T160, the first server 200 sends purchase completion page data to the terminal 10.

When the purchase completion page data is received from the first server 200 in T160, the terminal 10 causes the display unit 14 to display a purchase completion screen P2 represented by this data in T162. Due to this, the user can acknowledge that the purchase of the ink CTGs has been completed.

(Case B: FIG. 7)

Next, Case B will be described with reference to FIG. 7. The terminal 10 executes processes of T200 to T212 in accordance with the printer app 50. In Case B, the terminal 10 stores the model name "AAA" and the region information "YYY". The model name "AAA" and the region information "YYY" are stored in the memory 34 in the predetermined storage area different from that for the determination table 52. The terminal 10 determines based on the determination table 52 that the supported server corresponding to the model name "AAA" and the region information "YYY" is the second server 300 (NO to S14 of FIG. 4), and stores the second server information in T200 (S22).

In T202, the terminal 10 displays the top screen SC2 (YES to S30, S32), and in T210, it accepts the selection of the server icon 404 (trigger for the process of FIG. 5). In this case, the terminal 10 does not display the color selection screen SC4, and sends the model name "AAA" and the page request to the second server 300 (NO to S50, S70) without sending the color information to the second server 300 in T212. As above, the page request is sent to the second server

300 without the color selection screen SC4 being displayed in response to the selection of the server icon 404. Due to this, the web page can be displayed with a minimum number of operations.

When the page request is received from the terminal 10 in T212 without receiving the color information, the second server 300 specifies a plurality of ink CTGs that can be mounted on the printer 100 having the model name "AAA" from among the ink CTGs which the second server 300 is capable of selling. Then, the second server 300 generates a product selection page including information indicating the specified plurality of ink CTGs. Then, in T220, the second server 300 sends product selection page data representing this page to the terminal 10.

Processes from T222 are executed by the browser app 42 instead of the printer app 50 of the terminal 10. When the product selection page data is received from the second server 300 in T220, the terminal 10 causes the display unit 14 to display a product selection page P3 represented by this data in T222. The product selection page P3 is a screen for selecting one or more ink CTGs from among four CMYK ink CTGs. That is, the product selection page P3 is in a state where no ink CTG is in the so-called cart. As such, the user can select one or more ink CTGs in the product selection page P3.

The product selection page P3 includes checkboxes 452 corresponding to respective colors and a "Send" button 454. When one of the colors is selected by the user, a check mark is indicated in the checkbox 452 corresponding to this color. When the selection of the "Send" button 454 is accepted after the user's selection of two ink CTGs of M and K in the product selection page P3 has been accepted in T224, the terminal 10 sends CTG selection information indicating that the two ink CTGs were selected to the second server 300 in T226.

When the CTG selection information is received from the terminal 10 in T226, the second server 300 generates a product purchase page including information indicating the two ink CTGs as in the CTG selection information but not including information on other ink CTGs. Then, in T230, the second server 300 sends product purchase page data representing this page to the terminal 10.

When the product purchase page data is received from the second server 300 in T230, the terminal 10 causes the display unit 14 to display a product purchase page P4 represented by this data in T232. The product purchase page P4 includes a "Buy" button 460 for completing purchase of the selected two ink CTGs. That is, in the product purchase page P4, the two ink CTGs are in the so-called cart. Processes that take place hereafter are similar to T140 to T162 of FIG. 6 except that communication with the second server 300 is executed.

(Effects of Present Embodiment)

According to the present embodiment, the terminal 10 determines whether to access the first server 200 or the second server 300 (S14 of FIG. 4) by using the region information and the model name "AAA" stored in the memory 34. In the case of determining that the first server 200 is to be accessed, the terminal 10 displays the product purchase page P1 including the information for purchasing the two ink CTGs corresponding to M and K but not including the information for purchasing the ink CTGs corresponding to other colors (T132) by sending the color information indicating M and K as selected by the user and the page request to the first server 200 (S60 of FIG. 5, T122 of FIG. 6).

Since the colors of the ink CTGs are narrowed down in the product purchase page P1, the user can easily purchase the ink CTGs. A configuration may be considered in which the first server 200 with higher user convenience supports every region and all models. However, in view of the situation where there are various regions and printers with vast varieties of models, it may be difficult for the first server 200 to support every region and all models. Due to this, the second server 300 is provided in the present embodiment. In the case of determining that the second server 300 is to be accessed, the terminal 10 displays the product selection page P3 including the information for purchasing the ink CTGS corresponding respectively to CMYK (T222) by sending the page request to the second server 300 without sending the color information (S70 of FIG. 6, T212 of FIG. 7). Due to this, the user can select the color(s) of the ink CTG(s) to be purchased in the product selection page P3 and purchase these ink CTG(s).

(Corresponding Relationship)

The two servers 200, 300 are examples of "server". The printer app 50 of the terminal 10 is an example of "computer-readable instructions for a terminal device". The region information and the model name are examples of "specific information". The supported server being the first server 200 is an example of "predetermined condition". The page request in S60 and the page request in S70 of FIG. 5 are respectively an example of "first page request" and "second page request". The product purchase page P1 of FIG. 6 and the product selection page P3 of FIG. 7 are respectively an example of "first web page" and "second web page".

The color selection screen SC4 and the top screen SC2 (or SC3) are respectively an example of "first screen" and "second screen". The "Finalize" icon 430 and the server icon 404 are respectively an example of "first icon" and "second icon". The information 402 in the top screen SC2 of FIG. 4 is an example of "information indicating low remaining amount". The "Buy" button 450 included in the product purchase page P1 of FIG. 6 is an example of "purchasing button" included in "first web page". The "Buy" button 460 included in the product purchase page P4 of FIG. 7 is an example of "purchasing button" included in "third web page".

S10, S14 of FIG. 4 are respectively an example of "obtain specific information" and "determine whether a predetermined condition is satisfied or not". S60, S70 of FIG. 5 are respectively an example of "send a first page request and color information" and "send a second page request". T130 of FIGS. 6 and T220 of FIG. 7 are respectively an example of "send first web page data" and "send second web page data". S52 and S56 of FIG. 5 are an example of "cause a display unit of the terminal device to display a first screen". T42 of FIG. 3 is an example of "receive, for each of the plurality of cartridges mounted in the printer, remaining amount information". S32 and S34 of FIG. 4 are an example of "cause the display unit to display a second screen".

Specific examples of the present disclosure have been described in detail, however, these are mere exemplary indications and thus do not limit the scope of the claims. The art described in the claims include modifications and variations of the specific examples presented above. Some of modifications will be listed as below.

(Modification 1) The communication system 2 may comprise only one server instead of the first and second servers 200, 300. In this case, the terminal 10 may send the color information, the model name, and the page request to this server in S60 of FIG. 5, and send the model name and the page request to this server without sending the color information in S70. In general terms, the "server" may be a plurality of servers as in the above embodiment, or may be one server as in the present modification.

(Modification 2) The first and second servers 200, 300 may sell CTGs that contains other color materials such as toners instead of the ink CTGs. Further, in another modification, the first and second servers 200, 300 may sell other types of CTGs such as developing roller CTGs instead of the CTGs containing the color materials. In general terms, the "cartridge" is not limited to CTGs that contain color materials.

(Modification 3) The respective web pages P1 to P4 represented by the data received from the first and second servers 200, 300 may not be displayed by the browser app 42, and instead may be displayed by the printer app 50. In general terms, a subject of action that causes the display unit to display the first to third web pages may be the browser app as in the above embodiment, or may be the printer app as in the present modification.

(Modification 4) In the case of determining YES to S50 of FIG. 5, the printer app 50 may select the color(s) equal to or less than the predetermined remaining amount from among the four CMYK colors without executing S52 to S58. That is, the printer app 50 may automatically select the color(s) instead of accepting the user's color selection. In the present modification, "cause a display unit of the terminal device to display a first screen" may be omitted.

(Modification 5) The color selection screen SC4 may not include the ink remaining amount information. In general terms, the "first screen" may not include the remaining amount information.

(Modification 6) In S52 of FIG. 5, the color selection screen SC4 may not include the "Finalize" icon 430. In this case, the "Finalize" icon 430 may be displayed in S56 on condition that a color is selected in S54. Further, in another modification, the color selection screen SC4 may include the "Finalize" icon 430 displayed in a normal style instead of the gray-out style in S52. That is, the "Finalize" icon 430 may be configured capable of accepting the user selection in a state where no colors are selected. In this case, in S60, color information indicating that none of the colors were selected may be sent to the first server 200.

(Modification 7) The color selection screen SC4 may not include the "Finalize" icon 430. In this case, when one color is selected in the color selection screen SC4, the terminal 10 may send the color information indicating this color and the page request to the first server 200. In general terms, the "first screen" may not include the first icon.

(Modification 6) In the case where one color is selected in the color selection screen SC4, the printer app 50 may send the color information indicating this color to the first server 200 before the selection of the "Finalize" icon 430. After this, the printer app 50 may send the page request to the first server 200 when the "Finalize" icon 430 is selected. In general terms, the color information may be sent to the server before the first icon is selected. The color information and the page request may be sent to the server at a same timing as in the above embodiment, or may be sent at different timings as in the present modification.

(Modification 7) In the above embodiment, the printer app 50 executes the determination of S14 first, and thereafter displays the top screen SC2 in S32 or S34 as in FIG. 4. Instead of this, the printer app 50 may execute the processes of S30 to S34 of FIG. 4 first, and thereafter execute the processes of S10 to S22. In general terms, a timing to "determine whether a predetermined condition is satisfied" may be a timing before the second screen is displayed as in the above embodiment, or may be a timing after the second screen is displayed as in the present modification. Further, in another modification, the printer app 50 may execute the processes of S10 to S22 in a case where the S30 to S34 of FIG. 4 are executed first and thereafter the server icon 404 is selected. In general terms, the timing to "determine whether a predetermined condition is satisfied" may be a timing after the second icon is selected.

(Modification 8) S30 of FIG. 4 may not be executed. In this case, the top screen SC2 including the information 402 indicating that the ink remaining amount is low is not displayed, and the top screen SC3 is displayed instead. In general terms, the "second screen" may not include the information indicating low remaining amount. Further, in the present modification, "receive, for each of the plurality of cartridges mounted in the printer, remaining amount information" may be omitted.

(Modification 9) The product purchase page P1 of FIG. 6 includes the "Buy" button 450 for completing purchase, and the CTGs are already in the so-called cart. Instead of this, the product purchase page P1 may not include the "Buy" button 450. In this case, a CTG may be put in the cart when the user performs an operation to put the CTG in the cart in the product purchase page P1. In general terms, the "first web page" may not include the purchasing button.

(Modification 10) In S10 of FIG. 4, the printer app 50 may obtain only the region information without obtaining the model name. In this case, the determination table 52 may not include the model name. In another modification, the printer app 50 may obtain only the model name without obtaining the region information in S10. In this case, the determination table 52 may not include the region information. In general terms, the "specific information" simply needs to include at least one of the region information and the model information.

(Modification 11) In the above embodiments, the processes of FIGS. 3 to 7 are implemented by software, however, at least one of these processes may be implemented by hardware such as a logic circuit, etc.

What is claimed is:

1. A communication system comprising:
  a terminal device; and
  a server,
  wherein the terminal device comprises:
    a memory; and
    a controller configured to:
      obtain specific information stored in the memory, wherein the specific information includes at least one of region information indicating a region where the terminal device is used and model information of a printing device used by the terminal device, the printing device being configured to execute printing by using a plurality of cartridges corresponding to a plurality of colors;
      determine whether a predetermined condition is satisfied or not by using the specific information;
      in a case where it is determined that the condition is satisfied, send a first page request and color information to the server, the color information indicating a selected color selected from the plurality of colors; and
      in a case where it is determined that the condition is not satisfied, send a second page request to the server without sending the color information indicating the selected color to the server, and
    the server comprises a controller configured to:

in a case where the color information and the first page request are received from the terminal device, send first web page data representing a first web page to the terminal device, wherein the first web page includes information for purchasing a cartridge corresponding to the selected color among the plurality of colors indicated by the color information, and does not include information for purchasing a cartridge corresponding to a color among the plurality of colors which is different from the selected color; and in a case where the second page request is received from the terminal device without the color information being received from the terminal device, send second web page data representing a second web page to the terminal device, wherein the second web page includes, for each of the plurality of colors, information for purchasing a cartridge corresponding to the color.

2. The communication system as in claim 1, wherein the first web page includes a purchasing button for completing purchase of the cartridge corresponding to the selected color, and in a case where a specific cartridge is selected in the second web page by a user from the plurality of cartridges corresponding to the plurality of colors, a third web page including a purchasing button for completing purchase of the specific cartridge is displayed on the terminal device.

3. A non-transitory computer-readable recording medium storing computer-readable instructions for a terminal device, wherein the computer-readable instructions, when executed by a processor of the terminal device, cause the terminal device to:

obtain specific information stored in a memory, wherein the specific information includes at least one of region information indicating a region where the terminal device is used and model information of a printing device used by the terminal device, the printing device being configured to execute printing by using a plurality of cartridges corresponding to a plurality of colors;

determine whether a predetermined condition is satisfied or not by using the specific information;

in a case where it is determined that the condition is satisfied, send a first page request and color information to a server, the color information indicating a selected color selected from the plurality of colors.

4. The non-transitory computer-readable recording medium as in claim 3, wherein the memory is a memory of the terminal device.

5. The non-transitory computer-readable recording medium as in claim 3, wherein the computer-readable instructions, when executed by the processor of the terminal device, further cause the terminal device to:

in a case where it is determined that the condition is not satisfied, send a second page request to the server without sending the color information indicating the selected color to the server.

6. The non-transitory computer-readable recording medium as in claim 3, wherein the computer-readable instructions, when executed by the processor of the terminal device, further cause the terminal device to:

in a case where it is determined that the condition is satisfied, cause a display unit of the terminal device to display a first screen for selecting one or more colors from the plurality of colors, wherein in a case where it is determined that the condition is not satisfied, the first screen is not displayed on the display unit, and wherein in a case where the one or more colors are selected from the plurality of colors by a user in the first screen, the color information indicating the selected one or more colors is sent to the server.

7. The non-transitory computer-readable recording medium as in claim 6, wherein each of the plurality of cartridges corresponding to the plurality of colors is a color material cartridge containing a color material of a corresponding color, wherein the computer-readable instructions, when executed by the processor of the terminal device, further cause the terminal device to:

receive, for each of the plurality of cartridges mounted in the printing device, remaining amount information indicating a remaining amount of the color material contained in the cartridge from the printing device, wherein the first screen includes the remaining amount information.

8. The non-transitory computer-readable recording medium as in claim 6, wherein the first screen includes a first icon for finalizing selection of the one or more colors.

9. The non-transitory computer-readable recording medium as in claim 8, wherein in a case where the first icon is selected by the user after the one or more colors have been selected from the plurality of colors by the user, the color information and the first page request are sent to the server.

10. The non-transitory computer-readable recording medium as in claim 6, wherein the computer-readable instructions, when executed by the processor of the terminal device, further cause the terminal device to:

cause the display unit to display a second screen including a second icon for accessing the server, wherein in a case where it is determined that the condition is satisfied and the second icon is selected by the user, the display unit is caused to display the first screen.

11. The non-transitory computer-readable recording medium as in claim 10, wherein the computer-readable instructions, when executed by the processor of the terminal device, further cause the terminal device to:

in a case where it is determined that the condition is not satisfied and the second icon is selected by the user, send a second page request to the server without sending the color information indicating the selected color to the server.

12. The non-transitory computer-readable recording medium as in claim 10, wherein each of the plurality of cartridges corresponding to the plurality of colors is a color material cartridge containing a color material of a corresponding color, wherein the computer-readable instructions, when executed by the processor of the terminal device, further cause the terminal device to:

receive, for each of the plurality of cartridges mounted in the printing device, remaining amount information indicating a remaining amount of the color material contained in the cartridge from the printing device, wherein the second screen includes information indicating low remaining amount in a case where the plurality of cartridges includes a cartridge which has the remaining amount indicated by the remaining amount information being equal to or less than a predetermined amount.

13. The non-transitory computer-readable recording medium as in claim 3, wherein the specific information includes the region information and the model information.

14. A method performed by a terminal device, the method comprising:
obtaining specific information stored in a memory, wherein the specific information includes at least one of region information indicating a region where the terminal device is used and model information of a printing device used by the terminal device, and the printing device is configured to execute printing by using a plurality of cartridges corresponding to a plurality of colors;
determining whether a predetermined condition is satisfied or not by using the specific information;
in a case where it is determined that the condition is satisfied, sending a first page request and color information to a server, the color information indicating a selected color selected from the plurality of colors.

15. The method as in claim 14, wherein the memory is a memory of the terminal device.

16. The method as in claim 14, further comprising:
in a case where it is determined that the condition is not satisfied, sending a second page request to the server without sending the color information indicating the selected color to the server.

17. The method as in claim 14, further comprising:
in a case where it is determined that the condition is satisfied, causing a display unit of the terminal device to display a first screen for selecting one or more colors from the plurality of colors, wherein in a case where it is determined that the condition is not satisfied, the first screen is not displayed on the display unit, and
wherein in a case where the one or more colors are selected from the plurality of colors by a user in the first screen, the color information indicating the selected one or more colors is sent to the server.

18. The method as in claim 17, wherein
each of the plurality of cartridges corresponding to the plurality of colors is a color material cartridge containing a color material of a corresponding color, and
the method further comprises:
receiving, for each of the plurality of cartridges mounted in the printing device, remaining amount information indicating a remaining amount of the color material contained in the cartridge from the printing device,
wherein the first screen includes the remaining amount information.

19. The method as in claim 17, wherein the first screen includes a first icon for finalizing selection of the one or more colors.

20. The method as in claim 19, wherein in a case where the first icon is selected by the user after the one or more colors have been selected from the plurality of colors by the user, the color information and the first page request are sent to the server.

* * * * *